US012014588B2

(12) United States Patent
Tokman et al.

(10) Patent No.: US 12,014,588 B2
(45) Date of Patent: Jun. 18, 2024

(54) AUTOMATIC EVENT CLASSIFICATION (71) Applicant: Bendix Commercial Vehicle Systems LLC, Elyria, OH (US)

(72) Inventors: Andre Tokman, San Clemente, CA (US); Shaun M Howard, Irvine, CA (US); Andreas U Kuehnle, Villa Park, CA (US)

(73) Assignee: BENDIX COMMERCIAL VEHICLE SYSTEMS LLC, Avon, OH (US)

( * ) Notice: Subject to any disclaimer, the term of this patent is extended or adjusted under 35 U.S.C. 154(b) by 315 days.

(21) Appl. No.: 16/895,197

(22) Filed: Jun. 8, 2020

(65) Prior Publication Data

US 2021/0383623 A1 Dec. 9, 2021

(51) Int. Cl.
*G07C 5/08* (2006.01)
*G06N 3/045* (2023.01)
(Continued)

(52) U.S. Cl.
CPC ........... *G07C 5/0866* (2013.01); *G06N 3/045* (2023.01); *G06N 3/049* (2013.01); *G06N 3/084* (2013.01); *G07C 5/008* (2013.01); *G07C 5/0808* (2013.01)

(58) Field of Classification Search
CPC .... G07C 5/0866; G07C 5/008; G07C 5/0808; G06N 3/0454; G06N 3/049; G06N 3/084
(Continued)

(56) References Cited

U.S. PATENT DOCUMENTS 6,076,028 A  6/2000 Donnelly et al.
8,849,501 B2 9/2014 Cook et al.
(Continued)

FOREIGN PATENT DOCUMENTS

EP    3382570 A1   10/2018
WO 2017123665 A1    7/2017
(Continued)

OTHER PUBLICATIONS

"Smart Video, Smart Drivers: Modern Fleet Safety"; Verizon Connect (2019); printed Sep. 19, 2019 from https://www.verizonconnect.com/resources/article/smart-video-modern-fleet-safety/ ; 7 pages.
(Continued)

*Primary Examiner* — Tyler D Paige
(74) *Attorney, Agent, or Firm* — Brian E. Kondas; Cheryl L. Greenly; Geoffrey A. Kudlo (57) ABSTRACT

A fleet management server includes a memory and a processor. The processor is configured to: receive past event data associated with at least one vehicle and at least one driver, the past event data representing at least one respective past vehicle event that occurred when one of the drivers was driving one of the vehicles; receive respective predetermined classifications of the past vehicle events that were previously manually assigned based on respective contemporaneous videos of the past vehicle events; receive novel event data representing at least one respective novel vehicle event; automatically assign respective ones of the predetermined classifications to the novel vehicle events based on the previous manually assigned classifications to the past vehicle events; and output, to a user of the fleet management server, the respective automatically assigned predetermined classifications of the novel vehicle events.

31 Claims, 7 Drawing Sheets

(51) Int. Cl.
*G06N 3/049* (2023.01)
*G06N 3/084* (2023.01)
*G07C 5/00* (2006.01)

(58) Field of Classification Search
USPC ........................................................ 701/33.4
See application file for complete search history.

(56) References Cited

U.S. PATENT DOCUMENTS

| | | | |
|---|---|---|---|
| 9,524,269 | B1 | 12/2016 | Brinkmann et al. |
| 10,229,461 | B2 | 3/2019 | Akiva et al. |
| 10,300,922 | B2 | 5/2019 | Volos et al. |
| 2008/0147267 | A1 | 6/2008 | Plante et al. |
| 2012/0253892 | A1* | 10/2012 | Davidson ............ G06Q 10/0631 705/7.42 |
| 2014/0148972 | A1 | 5/2014 | Basir et al. |
| 2015/0127388 | A1 | 5/2015 | Oldham |
| 2017/0017927 | A1* | 1/2017 | Domnick .......... B60W 50/0097 |
| 2017/0369069 | A1 | 12/2017 | Yen et al. |
| 2018/0025430 | A1 | 1/2018 | Perl et al. |
| 2019/0285425 | A1* | 9/2019 | Ludwick ................ G08G 1/202 |

FOREIGN PATENT DOCUMENTS

| | | |
|---|---|---|
| WO | 2018026733 A1 | 2/2018 |
| WO | 2018144760 A1 | 8/2018 |
| WO | 2018229548 A2 | 12/2018 |
| WO | 2019068042 A1 | 4/2019 |

OTHER PUBLICATIONS

"How Artificial Intelligence Impacts Fleet Management"; Verizon Connect (original publication date unavailable); printed Sep. 19, 2019 from https://www.verizonconnect.com/resources/article/artificial-intelligence-fleet-management/ ; 8 pages.

"How Smart Video Fuels Smart Business"; Verizon Connect (2019); 8 pages.

"Fleet Dash Cams"; Verizon Connect (2019); printed Sep. 19, 2019 from https://www.verizonconnect.com/solutions/fleet-dash-cam/ ; 8 pages.

* cited by examiner

AUTOMATIC EVENT CLASSIFICATION

BACKGROUND

The present invention relates to classifying driver and vehicle events. It finds particular application in conjunction with automatically classifying such events and will be described with particular reference thereto. It will be appreciated, however, that the invention is also amenable to other applications.

Video surveillance systems are becoming more commonly used in fleet-owned vehicles to create video records of detected driving and vehicle events, incidents and happenings (e.g., excessive braking, collision mitigation braking, excessive curve speed, electronic/roll stability protection, etc.) in an effort to monitor drivers' behavior. The fleet owners frequently review and analyze the video records of the driving and vehicle event data in order to identify and understand the detected events and the particular drivers who exhibit undesirable driving behavior(s).

Currently, the fleet owners spend a great deal of time and expense watching and reviewing the video records and deciphering what happened during the driving and vehicle events to determine if the driver of the respective vehicle was at fault. Drivers are identified that have an at-fault or improper response record above an acceptable level for various driving and vehicle events tracked by the respective fleet owner. The identified drivers are then coached and/or disciplined by the fleet owner.

The present invention provides a new and improved apparatus and method which reduces the time and expense fleet owners spend watching the video records, while maintaining an acceptable level of correctly assigning fault to the drivers for the driving and vehicle events.

SUMMARY

In one aspect of the present invention, it is contemplated that a fleet management server includes a memory and a processor. The processor is configured to: receive past event data associated with at least one vehicle and at least one driver, the past event data representing at least one respective past vehicle event that occurred when one of the drivers was driving one of the vehicles; receive respective predetermined classifications of the past vehicle events that were previously manually assigned based on respective contemporaneous videos of the past vehicle events; receive novel event data representing at least one respective novel vehicle event; automatically assign respective ones of the predetermined classifications to the novel vehicle events based on the previous manually assigned classifications to the past vehicle events; and output, to a user of the fleet management server, the respective automatically assigned predetermined classifications of the novel vehicle events.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

In certain embodiments of the present invention, an on-vehicle event detection and reporting system may include one or more forward facing cameras that are configured such that the field of view of the camera(s) captures the scene ahead of the vehicle from, for example, the perspective of a driver of the vehicle. In one embodiment, the vehicle is included in a fleet of vehicles. Also, one or more driver facing cameras may be used to capture a view of the driver of the vehicle, and/or a view of other areas of the cabin, as the driver controls the vehicle while driving. Still other embodiments may include cameras configured to capture other scenes relative to the vehicle. For instance, embodiments may include cameras configured to capture the scene behind the vehicle, to either side of the vehicle, etc.

The event detection and reporting system may be further configured to collect and provide non-video data, including non-video event-based data, corresponding to a detected driving and/or vehicle event (individually and/or collectively referred to as 'event') that occurred at a particular point in time during a driving excursion. Such event-based data can include data collected from components of, or components interacting with, the event detection and reporting system.

These components can detect, in real time, driving or vehicle-related events that happen over the course of a driving excursion. The components can report such events to the event detection and reporting system. Examples of events that may be reported to/collected by the event detection and reporting system in real time include, for example and without limitation, excessive acceleration, excessive braking, exceeding speed limit, excessive curve speed, excessive lane departure, lane change without turn signal, loss of video tracking, a lane departure warning (LDW) system warning, following distance alert, forward collision warning, collision mitigation braking, etc.

Driving and/or vehicle events (e.g., events) can also be detected through an analysis of the captured driving video and/or audio. For example, the speed limit of a segment of road can be detected by analyzing the captured vehicle video to identify speed limit signs captured in the video. Upon identifying a speed limit sign, and the speed limit indicated thereon, a speed limit (change) event may be generated. Depending on embodiments, this analysis may be performed by the event detection and reporting system as the driving video is captured. In alternative embodiments, this analysis may be offloaded to remote systems. For example, the one or more driver facing cameras may act as a sensor to detect where the driver is looking (e.g., looking downward too long or not looking at a side mirror before reversing).

In accordance with an embodiment, the event detection and reporting system may use data collected directly from vehicle components (e.g., devices, sensors, or systems), and data collected from an analysis of vehicle video, to generate event datasets that correspond in time with one or more detected driving events. Event data generated for a detected event may be associated with captured video frames whose timeline spans or overlaps the time when the event was detected/collected. Event data generated from an event determined from processing of captured vehicle video may at least be associated with the video from which it was generated, but may also be associated with other captured video frames from other sensors whose timelines span or overlap the time when the event was detected/collected (in these scenarios, the time may be calculated based on the video frame or frames from which the event object was derived).

The particular invention disclosed and claimed herein relates to a system and method for automatically classifying vehicle events and characterizing multiple raters. Additional details are set forth below.

Figure 1:
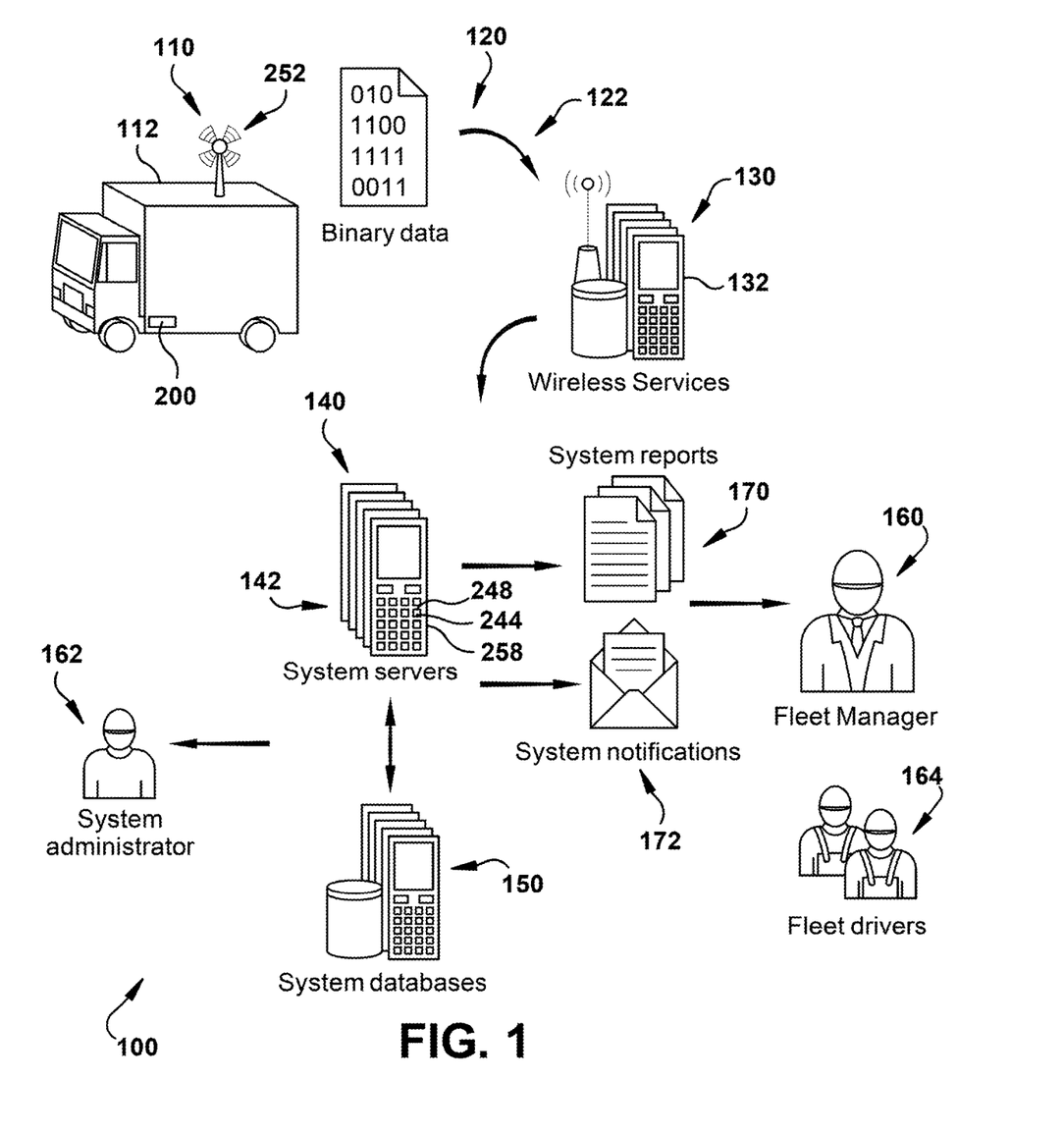
FIG. 1 illustrates a schematic representation of a diagram of an overview of a fleet management system configured in accordance with one embodiment illustrating principles of the present invention.

Referring now to the drawings, FIG. 1 illustrates an overview of a fleet management and reporting system 100 in accordance with one embodiment. In the example embodiment of the present invention, vehicles 110, such as trucks and cars, and particularly fleet vehicles 112, are configured with an event detection and reporting system 200 (see FIG. 2) that generates actual data relating to driving and vehicle events that may be of interest to a fleet manager or other user. Such a system 200 may include for example an LDW system 222 (FIG. 2) that generates signals indicative of an actual lane departure, such as lane wandering or crossing. Additionally, secondary systems to be described in greater detail below with reference to FIG. 2 carried by the vehicles or installed in the vehicle systems, include one or more video cameras, radar, lidar, transmission, engine, tire pressure monitoring and braking systems for example may generate additional safety event data and driver behavior data. Front facing cameras, radar and lidar-based systems may also be used to provide data relating to driver behavior in the context of following distance, headway time, response to speed signs, and anticipation of needed slowing.

With continued reference to FIG. 1, event data 120 may be selectively sent via communication links 122 to network servers 132 of one or more service providers 130. Communication service providers 130 may utilize servers 132 (only one shown for ease of illustration) that collect data 120 provided by the vehicles 112.

One or more servers 140 of the fleet management (e.g., fleet management server) and reporting system 100 are configured to selectively download or otherwise retrieve data either directly from the vehicles 112 via the service providers 130 or from collection servers 132 which may be third party servers from one or more various telematics suppliers. Servers 140 are configured to initiate processing of the event data in manners to be described in greater detail below. For example, in one embodiment, the one or more servers 140 include(s) a respective neural network 244, which is capable of being both trained and used (e.g., operated) for classifying events (e.g., inference mode). The neural network 244 includes an electronic neural network input 248 (e.g., continuous inputs, which may be aggregated (e.g., averaged) in a digital form) communicating with both the server(s) 140 and respective neural network 244; the neural network 244 also includes an electronic neural network output 258 electrically communicating with both the server(s) 140 and respective neural network 244.

A web application 142 executable on the one or more servers 140 of the fleet management and reporting system 100 includes a dynamic graphical user interface for fleet managers 160 and administrators 162 to view all of the information once it is processed. The subject fleet management and reporting system 100 of the example embodiment also includes one or more databases 150 configured to selectively store all event information provided from the vehicles 112 in the fleet 110 for one or more designated time intervals, including raw and post-processed trip data.

In accordance with the example embodiment, the system administrators 162 are users who are provided with interfaces to configure and manage fleets, monitor platform performance, view alerts issued by the platform, and view driver and event data and subsequent processing logs and/or views. Fleet managers 160 may view event information for their respective fleet for internal processing. These events can arrive via user-initiated reports 170 in the web application 142 executable on the one or more servers 140, or via email or other notifications 172. Fleet managers 160 may, depending on internal policies and processes or for other reasons, also interface with individual drivers 164 regarding performance goals, corrections, reports, coaching and/or positive feedback.

Figure 2:
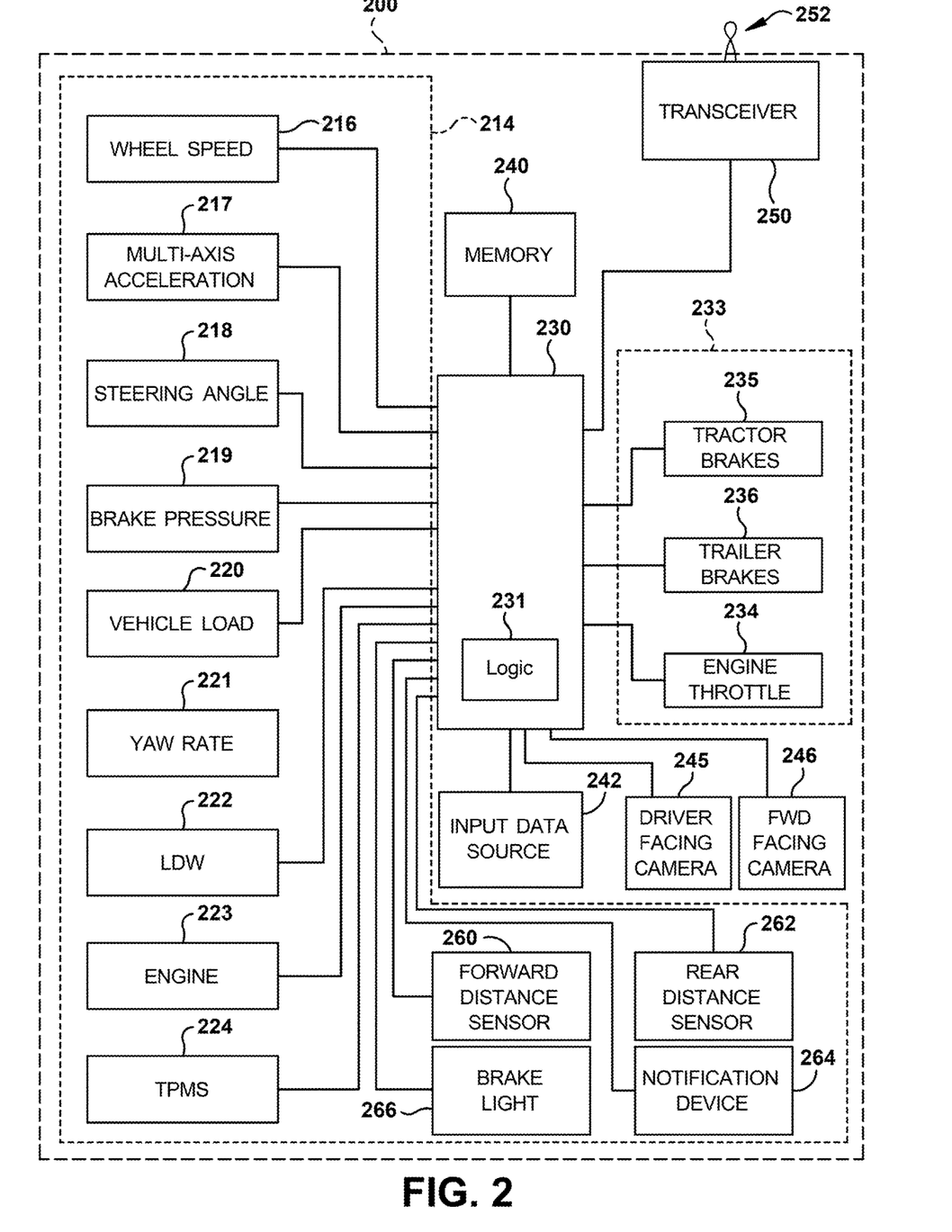
FIG. 2 illustrates a block diagram showing a vehicle-based computer system configured to implement one or more aspects of an embodiment illustrating principles of the present invention.

Referring now to FIG. 2, depicted is a schematic block diagram that illustrates details of an event detection and reporting system mentioned above, and which is configured to be used in accordance with one or more exemplary embodiments of the invention. As further detailed below, the in-vehicle event detection and reporting system 200 may be adapted to detect a variety of operational parameters and conditions of the vehicle and the driver's interaction therewith and, based thereon, to determine if a driving or vehicle event has occurred (e.g., if one or more operational parameter/condition thresholds has been exceeded). Data related to detected events (i.e., event data) may then be stored and/or transmitted to a remote location/server, as described in more detail below.

The event detection and reporting system 200 of FIG. 2 may include one or more devices or systems 214 for providing input data indicative of one or more operating parameters or one or more conditions of a commercial vehicle. Alternatively, the event detection and reporting system 200 may include a signal interface for receiving signals from the one or more devices or systems 214, which may be configured separately from system 200. For example, the devices 214 may be one or more sensors, such as but not limited to, one or more wheel speed sensors 216, one or more acceleration sensors such as multi-axis acceleration sensors 217, a steering angle sensor 218, a brake pressure sensor 219, one or more vehicle load sensors 220, a yaw rate sensor 221, an LDW sensor or system 222, one or more engine speed or condition sensors 223, and a tire pressure (TPMS) monitoring system 224. The event detection and reporting system 200 may also utilize additional devices or sensors in the exemplary embodiment including for example a forward distance sensor 260, a rear distance sensor 262 (e.g., radar, lidar, etc.), and a location sensor (e.g., a GPS sensor). Other sensors and/or actuators or power generation devices or combinations thereof may be used or otherwise provided as well, and one or more devices or sensors may be combined into a single unit as may be necessary and/or desired.

The event detection and reporting system 200 may also include brake light(s) 266 and/or notification device 264, and may be usable to provide headway time/safe following distance warnings, distance from a following vehicle warnings, lane departure warnings, warnings relating to braking, wheel speed, acceleration, vehicle load, yaw rate, engine speed/condition, TPMS and/or obstacle avoidance events.

The event detection and reporting system 200 may also include a logic applying arrangement such as a controller or processor 230 and control logic 231, in communication with the one or more devices or systems 214. In one embodiment, the control logic 231 realizes an associative server, which is on the vehicle. The processor 230 may include one or more inputs for receiving input data from the devices or systems 214. The processor 230 may be adapted to process the input data and compare the raw or processed input data to one or more stored threshold values or desired averages, or to process the input data and compare the raw or processed input data to one or more circumstance-dependent desired value(s).

The processor 230 may also include one or more outputs for delivering a control signal to one or more vehicle systems 233 based on the comparison. The control signal may instruct the systems 233 to provide one or more types of driver assistance warnings (e.g., warnings relating to braking and or obstacle avoidance events) and/or to intervene in the operation of the vehicle to initiate corrective action. For example, the processor 230 may generate and send the control signal to an engine electronic control unit or an actuating device to reduce the engine throttle 234 and slow the vehicle down. Further, the processor 230 may send the control signal to one or more vehicle brake systems 235, 236 to selectively engage the brakes (e.g., a differential braking operation). A variety of corrective actions may be possible and multiple corrective actions may be initiated at the same time.

The event detection and reporting system 200 may also include a memory portion 240 for storing and accessing system information, such as for example the system control logic 231. The memory portion 240, however, may be separate from the processor 230. The sensors 214 and processor 230 may be part of a preexisting system or use components of a preexisting system and may be extended by aftermarket additions.

The event detection and reporting system 200 may also include a source of input data 242 indicative of a configuration/condition of a commercial vehicle. The processor 230 may sense or estimate the configuration/condition of the vehicle based on the input data, and may select a control tuning mode or sensitivity based on the vehicle configuration/condition. The processor 230 may compare the operational data received from the sensors or systems 214 to the information provided by the tuning.

In addition, in the illustrated embodiment, the event detection and reporting system 200 is operatively coupled with one or more driver facing imaging devices, shown in the example embodiment for simplicity and ease of illustration as a single driver facing camera 245 that is aimed on the driver and/or aimed on the interior of the cab of the commercial vehicle. However, it should be appreciated that one or more physical video cameras may be disposed on the vehicle such as, for example, a video camera on each corner of the vehicle, one or more cameras mounted remotely and in operative communication with the event detection and reporting system 200 such as a forward-facing camera 246 to record images of the roadway ahead of the vehicle. In the example embodiments, driver data can be collected directly using the driver facing camera 245 in accordance with a detected driver head position, hand position, or the like, within the vehicle being operated by the vehicle. In addition, driver identity can be determined based on facial recognition technology and/or body/posture template matching. Driver head pose and attention statistics may be derived from driver facing camera images.

Still yet further, the event detection and reporting system 200 may also include a transmitter/receiver (transceiver) module 250 such as, for example, a radio frequency (RF) transmitter including one or more antennas 252 for wireless (e.g., cellular) communication of the automated control requests, global position sensor (GPS) data, one or more various vehicle configuration and/or condition data, or the like between the vehicles and one or more destinations such as, for example, to one or more services (not shown) having a corresponding receiver and antenna. The transmitter/receiver (transceiver) module 250 may include various functional parts of sub portions operatively coupled with a platoon control unit including for example a communication receiver portion, a GPS receiver portion, and a communication transmitter. For communication of specific information and/or data, the communication receiver and transmitter portions may include one or more functional and/or operational communication interface portions as well.

The processor 230 is operative to combine selected ones of the collected signals from the sensor systems described above into processed data representative of higher-level vehicle condition data such as, for example, data from the multi-axis acceleration sensors 217 may be combined with the data from the steering angle sensor 218 to determine excessive curve speed event data. Other hybrid event data relatable to the vehicle and driver of the vehicle and obtainable from combining one or more selected raw data items from the sensors includes, for example and without limitation, excessive braking event data, excessive curve speed event data, LDW event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, average ACC usage event data, excessive brake fade, poor vehicle controllability, and late or inefficient speed adaptation (such as that given by signage, rumble strips, or exiting).

The event detection and reporting system 200 of FIG. 2 is suitable for executing embodiments of one or more software systems or modules that perform vehicle brake strategies and vehicle braking control methods according to the subject application. The example event detection and reporting system 200 may include a bus or other communication mechanism for communicating information, and a processor 230 coupled with the bus for processing information. The computer system includes a main memory 240, such as random-access memory (RAM) or other dynamic storage device for storing instructions to be executed by the processor 230, and read only memory (ROM) or other static storage device for storing other static information and instructions for the processor 230. Other storage devices may also suitably be provided for storing information and instructions as necessary or desired. In one embodiment, the neural network 244 is used for classifying (e.g., automatically classifying) the detected driving and/or vehicle events, which is discussed in more detail below.

Instructions may be read into the main memory 240 from another computer-readable medium, such as another storage device of via the transceiver 250. Execution of the sequences of instructions contained in main memory 240 causes the processor 230 to perform the process steps described herein. In an alternative implementation, hard-wired circuitry may be used in place of or in combination with software instructions to implement the invention. Thus, implementations of the example embodiments are not limited to any specific combination of hardware circuitry and software.

As discussed above, in one embodiment of the present invention, the detected driving and/or vehicle events (typically safety relevant events of sufficient amplitude and duration) are classified. One method to classify events involves a human being manually reviewing the videos and synchronous vehicle/driver/environment data before (e.g., about 5-10 seconds pre-event or prequel) and after (e.g., about 5-10 seconds post-event or sequel) the respective events. The synchronous vehicle/driver/environment data before and after an event is referred to a pre-post event (PPE) data. In one example, the driver hit the brakes hard to prevent a collision, and so the video and PPE data are recorded for the event; or the driver entered a curve too fast and a large lateral acceleration triggers a similar recording. Another method to classify events involves a computer processor automatically reviewing the videos and PPE data for the respective events before a human. In other words, the automatic event classification (AEC) makes initial determinations of the events, based on the data computer processor's automatic review of the videos and/or PPE data, before a human reviews (optionally) the information to classify the events.

Many of the captured events are 'false positives' that are not of interest and, therefore, should not need to be reviewed by a person. Examples of such false positives include, without limitation:
the event was not the driver's fault (e.g., another vehicle cut-in front of the driver's vehicle);
the event was improperly triggered (e.g., the vehicle struck a pothole);
there was a proper reaction to an event (e.g. driver properly braked due to a cut-in);
the information associated with the event cannot be used to help the driver improve;
the event occurred at insufficient speed to be of interest; and
the event occurred within known problem, irrelevant (e.g. freight yard), or expected occurrence prone areas.

In one embodiment, the initial determination of the events made by the AEC is used to filter out events that are clearly false positives, so that the human reviewer can review fewer events. In a more specific example of the present invention, the AEC is based on the PPE data, which functions as a proxy for the events in the video. In other words, since the PPE data is considered as a proxy for the events in the video, the AEC reviews only the PPE data and not the associated video of the respective events.

The goal of the AEC system is to aid the reviewers by and rank/filter/rate/classify the events so that they can be identified as 'of interest' (e.g., relevant), 'of moderate interest' (e.g., moderately relevant) or 'not of interest' (not relevant). That way, the human reviewers can focus their reviews on those events that the machine classification has deemed 'of interest' and 'of moderate interest' and so more likely to be of further (human) interest.

In one embodiment of the present invention, the AEC utilizes the neural network 244 to analyze the PPE data, which includes relevant spatial information of the events, without analyzing the corresponding image. Analyzing the PPE data is a relatively simpler task (e.g., requires less time, computing power, less expensive hardware, may be performed at least partially on the vehicle producing real-time event interest ratings, etc.) than analyzing the corresponding imagery. For example, the PPE data includes at least one or more of these components: the vehicle speed, the vehicle steering angle, braking force, and a distance to another vehicle ahead (a forward vehicle). Temporal relations between these PPE data components are excellent proxies for how well/correct/properly a driver of the vehicle performs. Since the PPE data extends from 5-10 seconds before an event to 5-10 seconds after, the PPE data encompasses both prequel and sequel spatial relations, actions and results, which may be considered a more relevant measure for accident prevention than how things appear in the corresponding video. For example, though the viewer of the video may be able to read a license plate of the forward vehicle, such information is only a proxy for the vehicle getting too close in absolute terms to the forward vehicle, and the actual distance is what matters.

The system 100 uses prior fleet ratings, these generated after (humans) viewing video, and associates them with PPE time histories. For instance, if a human reviewer saw that the driver was very close for too long a time, this PPE sequence would be labeled as safety-relevant/of interest/etc. The next time a similar too close for too long PPE sequence is seen, seeing the video would not be necessary to understand that this was a safety-critical event.

In one embodiment, the PPE data for a given event includes at least the following components:
TripEventID (unique database identifier);
EventType (what triggered the event?);
Timestamp (when?);
Classification (what did the human reviewer assign here?);
Speed (speed of the vehicle);
Speed of Forward Vehicle;
Distance to Forward Vehicle;
Braking Force; and
Accelerator Percentage.

For a given event, the PPE data components are continuous variables that change over time, with the exception of the static TripEventID, EventType, and Classification values. Each of the continuous PPE variables are collected at intervals of 0.26 seconds. The PPE variables are averaged into 1-second intervals and then normalized using min-max normalization. A multi-dimensional time-series dataset is created from this preprocessed PPE data, which includes all of the averaged, normalized continuous variables from the time span of −6 seconds before the event to +5 seconds after the event. The resultant dataset is the input to the neural network 244 (e.g., a deep neural network). The output(s) of the neural network 244 are designed to mimic the classifications of experienced human reviewers for similar events, whether through a floating point importance score value or annotative (e.g., natural language) classification, depending on the embodiment.

The structure of the neural network 244 is adapted to time series application.

In one embodiment, AEC produces a physical change in what a human reviewer sees, is presented with, or is sent, with reordering, highlighting, selective fading, removal, segregation, alternative coloring, etc. used for each event, e.g., a color-coded value for focusing the human reviewer's attention and aiding him/her in producing faster responses to the question of whether events are of interest are produced. Such physical changes in what a human reviewer sees saves labor, costs, and time, while identification of dangerous drivers is made more quickly, thereby improving everyone's driving safety. Vehicle drivers may be rapidly informed of event severity and their vehicles stopped or removed from service if needed.

In one embodiment, the AEC produces a single, respective output for each event that is either a zero (0) (e.g., the event is not relevant) or a one (1) (e.g., the event is relevant). In another embodiment, the AEC produces a single, respective output for each event that ranges between zero (0) (e.g., the event is not relevant at all) and one (1) (e.g., the event is extremely relevant), which signifies the degree of interest the PPE data indicates the associated video to hold. In the aforementioned embodiments, the important (1) and non-important (0) data are grouped in a binary fashion and provided to the network during the training phase. The network then generalizes what it learns from the training dataset to predict the importance of an event using a floating-point value varying from 0 to 1.

There are many possible reasons why the AEC network might decide that an event is important or not important; however, in the embodiments described thus far, the network cannot provide the English reason as to why the event was important or not. This is due to the obscuration of the actual classification details during the training process. In order to automatically provide an English classification to the end-user, the classifications must be retained in the dataset, not obscured. Thus, an alternative to the aforementioned embodiments is to retain the human reviewer classifications and create a system to assign them based on the input PPE data.

Therefore, an addition to an AEC system is to have a second, multi-class network. This network has N output neurons, where N>2. In this case, each neuron corresponds to a human classification. In a fashion similar to the single output neuron network described above, 60 PPE data values are presented to input(s) 248 of the neural network 244, and the neural network 244 learns to associate this input to a particular 'hot' output neuron, which is produced as an output 258 of the neural network 244, having a high value. This learning is done in a particular way, different than the previous embodiments of the network. The 'hot' sufficiently high value neuron indicates which classification best matches the event.

For example, suppose there are 10 possible classifications. The classifications are assumed to be mutually exclusive, so only one is the correct match. The target classification in the training data may then be represented as a one-hot binary vector, which is an ordered list of the classifications with at most one element being one (1). For example, [0 0 1 0 0 0 0 0 0 0] represents that the target class is the third class in the ordered list. Furthermore, the output of such a network would also be a one-hot vector with a 1 in the index of the predicted class of the input PPE data.

Training of such a multiclass neural network 244 proceeds as follows. A plurality of PPE data and video ratings, the latter now given as one-hot multi-element binary vectors, are presented to the neural network 244 with 60 inputs 248 and, in this example, 10 outputs 258. Output neurons produced at the outputs 258 are softmax probabilities and their output values can vary between zero (0) and one (1). All the outputs sum to 1. Typically, no single output will be exactly one (1) and none of the outputs will be exactly zero (0). In the one-hot notation, the highest probability neuron is considered the winning class and is set to 1 as all other classes are set to 0.

Softmax normalization takes each output of the neural network 244 and exponentiates it (i.e., e to the output power is calculated). The sum of all these exponentiated outputs is calculated. Finally, each exponentiated output is divided by the summed exponentiated outputs. The resulting quotients sum to one and may be interpreted as the probability of a classification matching the event. A threshold may be applied on the output softmax probability to declare a particular classification to be sufficient. Alternatively, if a matching classification is not found with a high enough probability, then this second network result may be neglected and replaced with a "human review is necessary" classification.

This neural network 244 with multiple outputs 258 learns to associate patterns in the PPE with the natural language (e.g., English), human-assigned classifications for both important and non-important events and thereby forms a complementary, explanatory addition to the single output network described earlier. The output of this more complicated neural network 244 may be used instead of or with the output of the first network.

Figure 3:
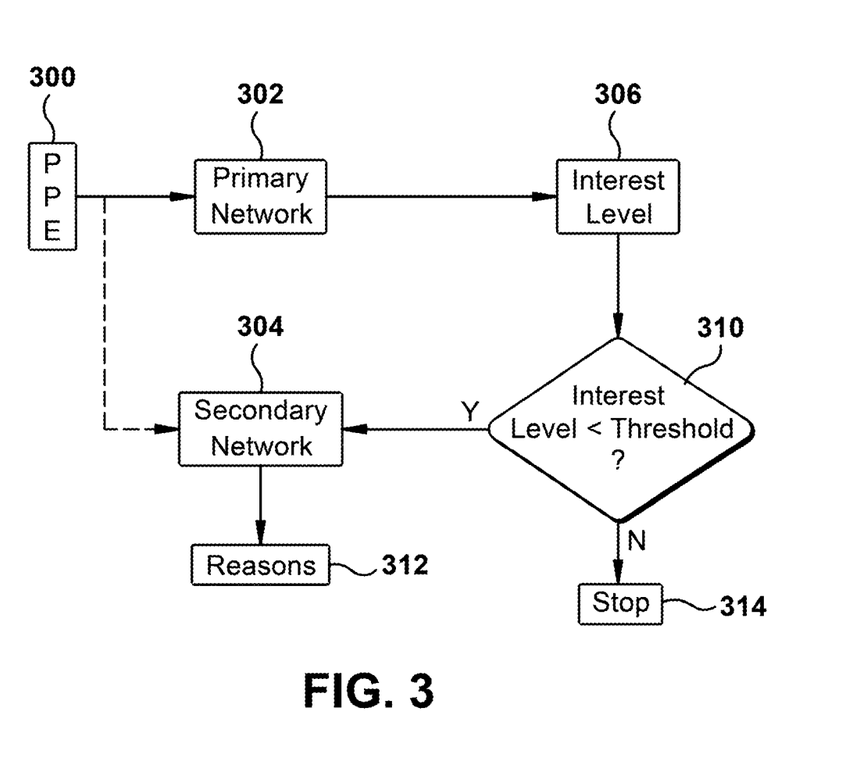
FIG. 3 illustrates a block diagram showing parallel networks configured to implement one or more aspects of an embodiment illustrating principles of the present invention.

With reference to FIG. 3 a computationally efficient way to use an explanatory addition to a single output network is illustrated. PPE data 300 is transmitted to a primary network 302 and, optionally, to a secondary network 304. Once the primary network 300 determines the interest level of the event (e.g., 'not of interest', moderate interest or 'of interest'), the interest level is passed to a block 306. A determination is made in a block 310 whether the interest level is greater than or less than a predetermined threshold. If the interest level is greater or less than the predetermined thresholds, the PPE is passed to the secondary network 304, which provides reasons 312 why the interest level is where it is. Otherwise, if it is determined in 310 that the interest level does not fall above or below the predetermined thresholds, the process stops in 314.

With reference again to FIG. 2, the intention of the above networks is to reduce and/or avoid the unnecessary typical and computationally expensive machine classification of video. A computationally cheaper compromise, with much of the benefits of a full video analysis network, is a multi-stream architecture. Such a hybrid input ('multi-stream') network can use PPE data and a small subset of the video images. This multi-stream network consists of two (2) initially independent parts, one of these the PPE analyzer described above, and the other part being an image analysis network. The two (2) are combined in a network layer following the outputs of the PPE analyzer and the image analyzer, with the new final output layer being either of 1) a single sigmoid neuron whose output value is the degree of interest this PPE data and imagery subset is deemed to have or 2) two or more neurons with the softmax activation function in order to provide a multi-class classification based on the input data. Because the PPE data and the video data are of fundamentally different natures, the output of this multi-stream system may be expected to be more robust than that of a PPE-only network. For instance, PPE data cannot 'see' if there really was a forward vehicle present at the time an event occurred, whereas a camera image analysis can confirm this.

Finally, users of the AEC classified videos have the option of also manually classifying (e.g., post-classifying) the videos. This optional user input is particularly valuable as it may be used as new training data for the neural network machine AEC classifier, either as confirmation of the neural network machine's AEC decision or, more usefully, as a corrective contradiction thereof. Patterns of incorrect machine classifications—geographic, road type, weather-related, time of day, vehicle type, and so on—may accumulate in this contradictory (i.e., AEC or sensor logic was wrong) data, indicating shortcomings in the training data set or the need for additional sensor information (e.g. a light intensity or image contrast value). If such clusters of misclassifications exist, additional training data may be focused on these with the goal of reducing them.

An association is created between the PPE data (e.g., the proxy for the video) and an associated video. Such an association is created by presenting many examples of paired PPE data and the ratings that human reviewers have given the corresponding videos to a machine learning method that can learn the association. When the machine learning has created a good association, the difference between the ratings that the purely PPE based machine learning gives and the ratings that the human video viewers have given is relatively small. The summed differences between many PPE/human video rating data sets is used as a measure of error, and when this difference is small, a good association exists. The machine learning adjusts its internal parameters to make this difference small, as is described below with reference to FIG. 4.

Figure 4:
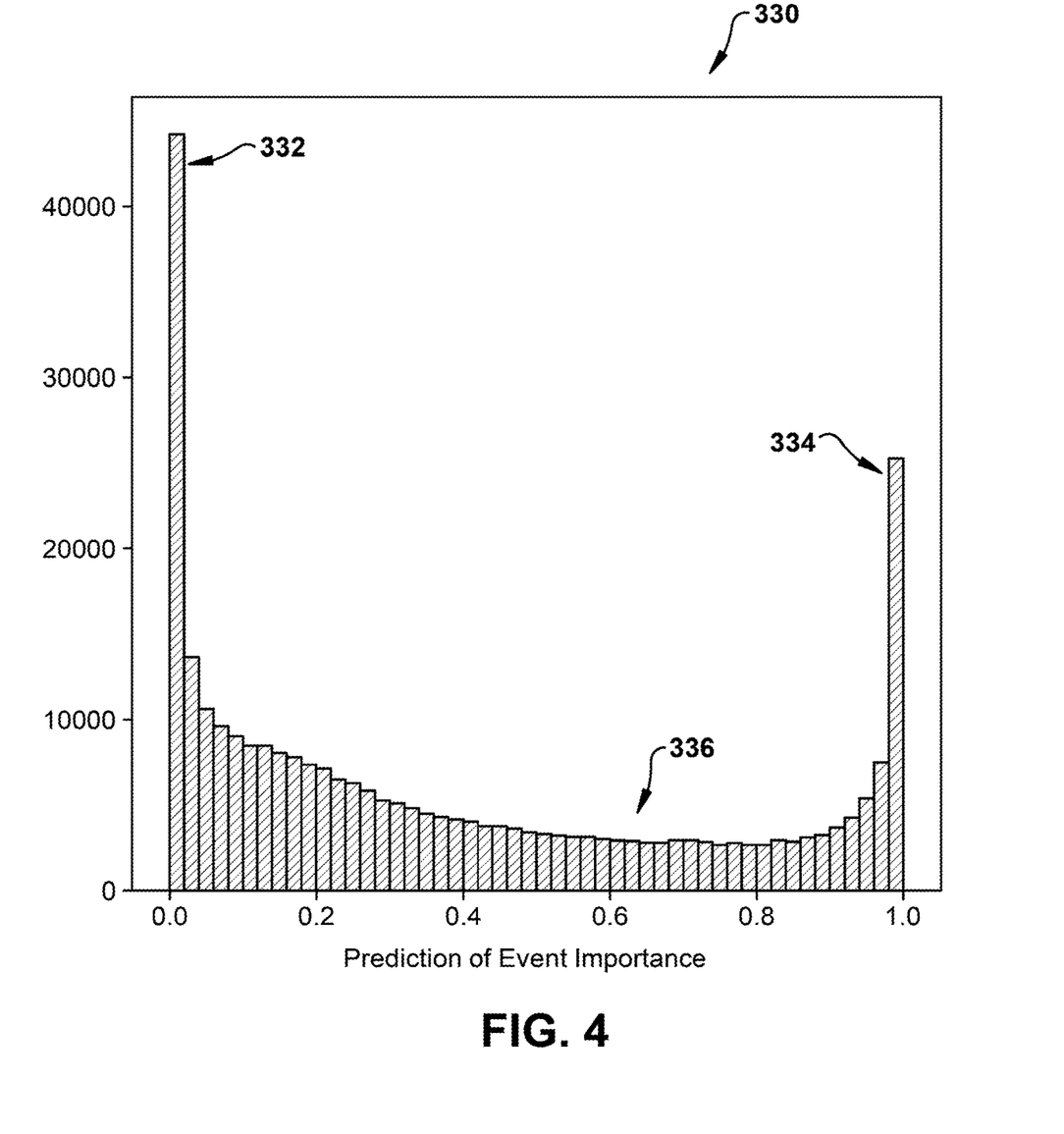
FIG. 4 illustrates a histogram of a number of events versus a prediction of the event importance.

With reference to FIG. 4, the differences between the human reviewers' ratings and those produced by the machine may be partially visualized with a histogram 330 showing a number of times a machine outputs a value (e.g., between and including 0 and 1) versus the machine's predicted importance of a particular event. The human reviewers assign ratings of either zero or one, with peaks at only those values, whereas the machine produces ratings anywhere between and possibly including zero and one. The histogram 330 illustrates outputs for the machine classifying excessive braking events. It may be recalled that the human ratings are only at either zero or one. It may be seen that two peaks 332, 334 still exist in the machine's ratings, one peak 332 at values near zero and the other peak 334 at values near one. This drift towards either 0 or 1 is a consequence of the training of the machine, which tries to imitate the human ratings. If the machine were perfect and could exactly duplicate the humans' ratings, then these peaks 332, 334 would match the human values and there would be no machine outputs at the intermediate values between 0 and 1. Because the machine is not perfect, however, and because there are unclear cases, these peaks 332, 334 generally correspond well to the humans' ratings, but not always (e.g. the machine can make significant mistakes but can also indicate an uncertainty via the values between 0 and 1 that is not visible in the human ratings). As shown, the machine produces many ratings neither near zero nor near one, in a broad U-shaped valley 336 between the respective peaks 332, 334 at zero and one. These less certain ratings are used to rank—which the binary, human, ratings cannot—the events by level of interest, and so can better guide further human review toward first examining the most interesting recordings.

With reference again to FIG. 2, in one example, the PPE data consists of the time histories of five (5) sensor values: vehicle speed, absolute value of braking force, accelerator percentage, distance to nearest forward vehicle via radar, and speed of nearest forward vehicle via radar. These sensor values are assembled together into a single block. Twelve (12) seconds of PPE data, covering from six (6) seconds before an event to five (5) seconds after, in increments of one (1) second are concatenated into a single data vector including 60 PPE data points: PPE data={vehicle speed (−6 sec) vehicle speed (−5 sec) . . . vehicle speed (+5 sec) braking force (−6 sec) braking force (−5 sec) . . . braking force (+5 sec) . . . accelerator percentage (−6 sec) accelerator percentage (−5 sec) . . . accelerator percentage (+5 sec) . . . distance forward vehicle (−6 sec) distance forward vehicle (−5 sec) . . . distance forward vehicle (+5 sec) . . . speed forward vehicle (−6 sec) speed forward vehicle (−5 sec) . . . speed forward vehicle (+5 sec)}. For example, speed is km/hr, distance is meters, braking force is g and accelerator percentage is a value between 0 and 1.

The twelve (12) time steps and 5 measured quantities (e.g., sensor values) produce a vector with 12*5=60 elements. A min-max normalization step of converting each element to a value between 0 and 1 is applied. The normalization formula is the following: {value−min(value)}/{max(value)−min(value)}. This normalization scheme is used for all the PPE data fed to the network. The minimum and maximum values used per each variable are derived from the population distribution of the variable. For instance, take the vehicle speed variable which has a minimum of 0 kph and a possible maximum of 100 kph. The normalization of this variable would be: normalized speed=(speed−0)/(100−0). So, an original speed of 0 remains a normalized speed of 0 and an original speed of 100 kph becomes a normalized speed of 1. This mathematical transformation has just two parameters that define it, the minimum and the maximum values of the variable. The machine learning algorithms described below have thousands of parameters that define them, so allowing for much more complicated relations between the 60 (PPE) inputs and the single (interest level) or multi-class output. The values of these parameters are set in a training phase, now described.

Figure 5:
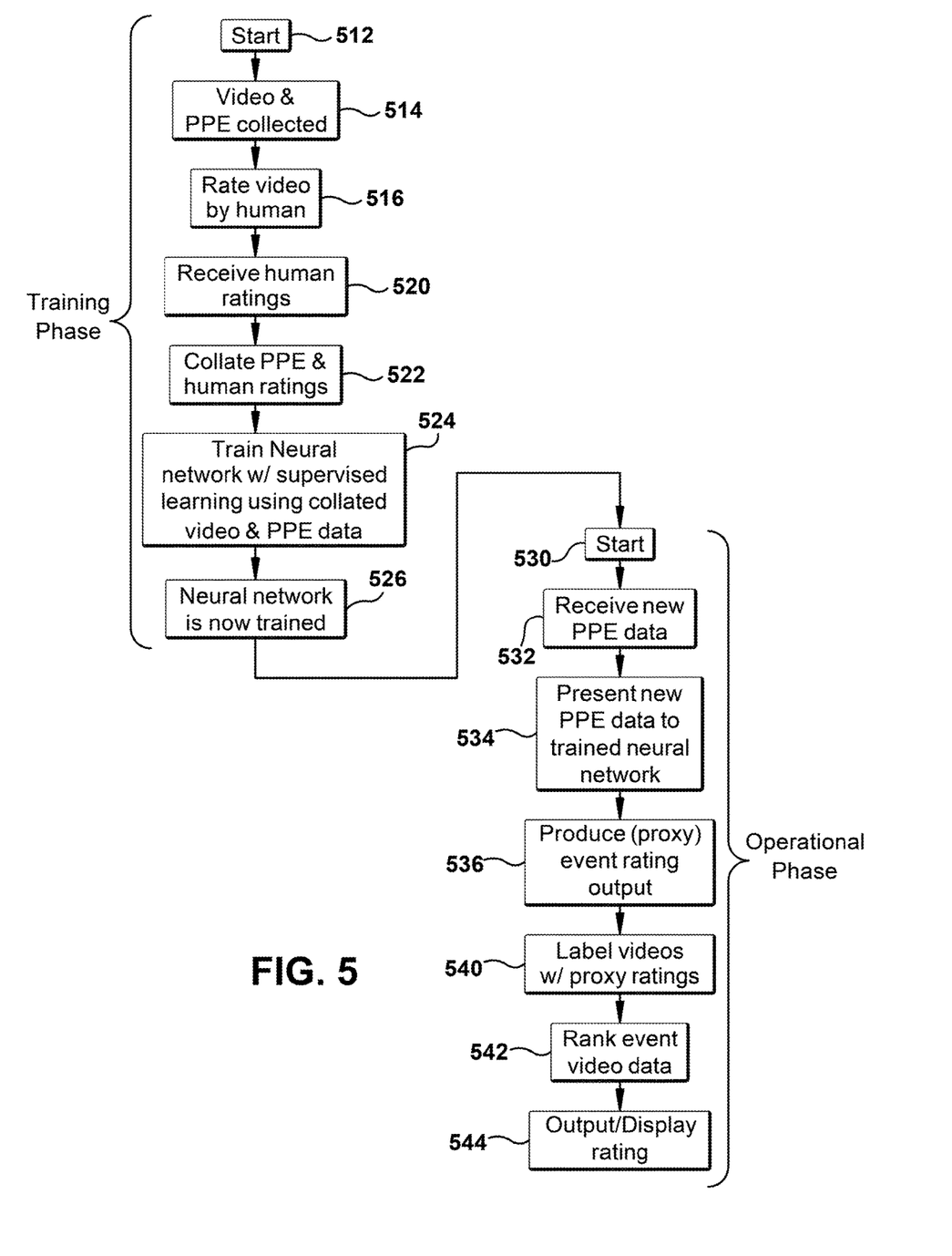
FIG. 5 is an exemplary methodology of classifying events in accordance with one embodiment illustrating principles of the present invention.

FIG. 5 illustrates an exemplary methodology of the system shown in FIG. 2 for processing PPE data. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 2 and 5, the method starts in a step 512. There are two (2) phases of the process: a training phase and an operation phase (e.g., inference phase). The method starts the training phase in a step 514, during which video and PPE data (e.g., past event data) are collected by the processor 230 for an event (e.g., a past vehicle event). The past event data represents at least one respective past vehicle event that occurred when one of the drivers was driving one of the vehicles. In a step 516, a human reviewer classifies the video in one of several predetermined classifications and rates the video as either zero (0) (e.g., not of interest) or one (1) (e.g., of interest) based on the classification. In a step 520, the neural network 244 receives the human ratings. The human ratings represent manually assigned classifications of contemporaneous videos of the past vehicle events. Then, in a step 522, the PPE data and human ratings of the respective videos are associated (e.g., collated). In a step 524, the neural network 244 is trained with supervised learning, using the collated video and PPE data. Then, in a step 526, the neural network 244 is considered trained.

The operation phase starts in a step 530 and uses the trained neural network from the step 526. PPE data ('new PPE data') from a new (novel) vehicle event is received in a step 532. In a step 534, the new PPE data is transmitted to the trained neural network (see step 526)—where the new PPE data acts as a representative proxy for the respective video. In other words, one of the predetermined classifications is automatically assigned to the novel vehicle event based on the previous manually assigned classifications of the past vehicle events. Then, in a step 536, the neural network 244 outputs a proxy event rating (e.g., automatically assigned importance score or classification of the novel vehicle event) based on the new PPE data to, for example, the fleet server. The respective video is tagged (e.g., labeled) with the proxy event rating in a step 540. The event video data, which includes the proxy event rating, is ranked in a step 542. The rating is displayed in a step 544.

In one embodiment, the driver data is identified in the novel event data, and the respective driver data is output with the automatically assigned predetermined classifications of the novel vehicle events. In one example, the output novel vehicle events are organized (e.g., ordered) by the driver data, by time, by frequency, by location, by event-type, by specially indicated drivers, by events in particular locations, by coming from particular vehicles, etc.

Figure 6:
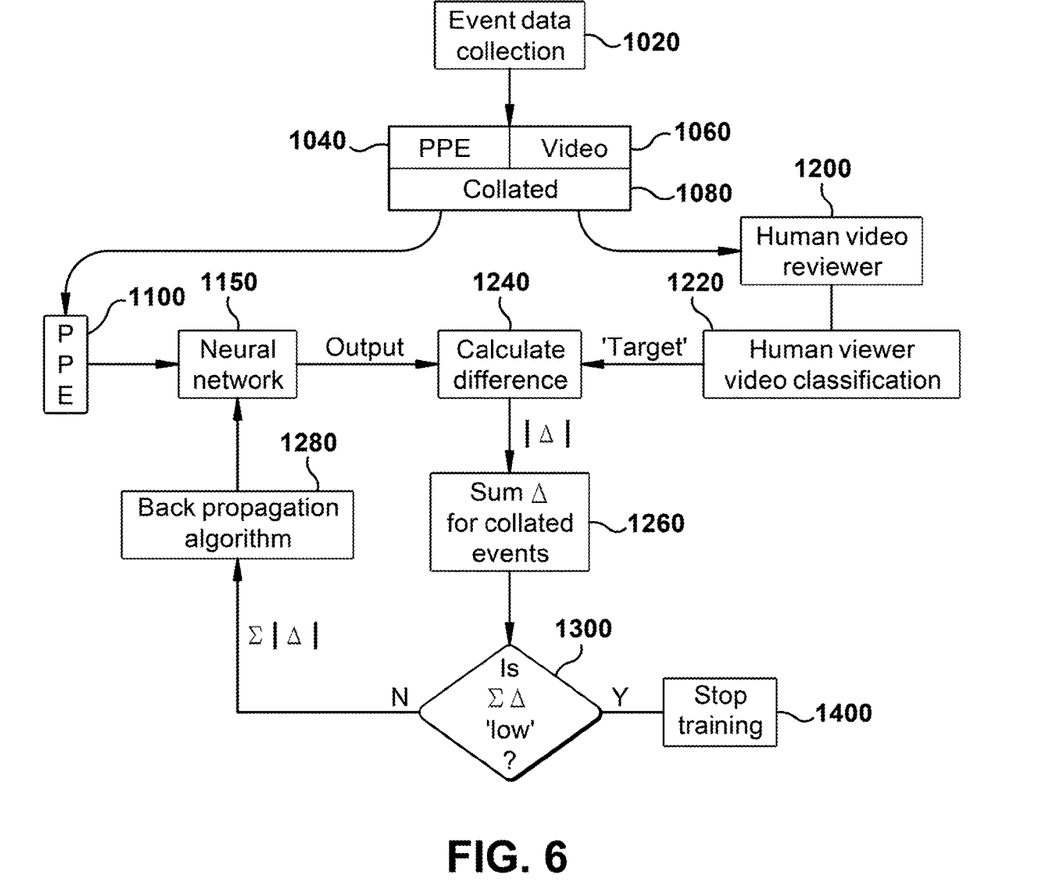
FIG. 6 an exemplary methodology of training a neural network in accordance with one embodiment illustrating principles of the present invention.

FIG. 6 shows the neural network training process (see steps 512-526 of FIG. 5), which uses supervised learning. Event data is collected in a first step 1020. This event data consists of paired PPE data 1040 and (corresponding, simultaneously recorded) video 1060. The video may be recorded from a forward-facing camera, but may also come from other cameras as well, e.g. an additional, driver-facing, camera. The data is collated in a step 1080. The video data 1060 is sent to human reviewer(s) 1200, who view the videos 1060 and assign them ratings in a step 1220. These ratings may be of many classes, in which case the many classes are grouped (a possible grouping step is not shown) into just two, 'target', values. Alternative embodiments may perform a similar reduction/aggregation from many to fewer classes, though with more than just two aggregated classes. The PPE data 1040 is formatted and then presented in step 1100 to a neural network 1150. The parameters for this neural network are set to random values to start using, e.g., the "glorot uniform" parameter selection strategy, and so the outputs that this network produces initially typically do not match the human reviewers' ratings. It is desired to adjust the network parameters such that the network outputs are as similar as possible to the human reviewers' ratings. The two values—the 'target' set by the human reviewers in 1220 is compared in step 1240 with the neural network's output and the absolute value of the difference for each PPE/video pair in the collated data 1080 is calculated. A separate and disjunct portion of this collated data 1080 may be set aside for network verification and testing purposes. The absolute values of the differences $|\Delta|$ are summed in a step 1260. If the summed absolute value is a small number (e.g., less than 0.2 on average, considering all the samples used in training), then there is good agreement between the human reviewers' ratings and those produced by the network. This is usually not the case, however, and a step 1300 compares the summed differences with a threshold. If the sum of the differences is small, then training is declared done in a step 1400. If the sum of the differences still exceeds the threshold in 1300, then this sum of differences is sent to a back-propagation algorithm step 1280 that adjusts the internal parameters (weights, biases, etc.) of the neural network. The sense of the adjustment is such that when the neural network is applied to the PPE data again, it typically (e.g. stochastically) better matches the human reviewers' ratings, and forms an iterative, corrective, feedback loop. The iteration stops when either the summed difference from this training data is small enough or, better, the error for the set aside ('test') data is small, or enough iterations have been made.

After the neural network training phase (see steps 512-526 of FIG. 5), the now trained neural network is used in the operational (e.g., inference) phase (e.g., steps 530-542). Training may be periodically redone as new information or better network architectures become available. In the operational (e.g. inferential) phase, novel PPE data is presented to the network, which then uses what it has learned to produce an output (proxy) rating for the event and the as yet unseen video thereof. The value produced by the output neuron is displayed to a user in a step 544. As discussed above, the value produced by the output neuron may also be mapped into different display colors to indicate the severity/interest level/relevance of the event. For example, red may be used to display a more severe/higher interest level event than a moderate severity/moderate interest level event, which may be displayed using yellow. A non-severe/not of interest event may be displayed in green. The color-coded events may selectively be presented in an ordered list, by driver, by time, by frequency, by location, by event-type, by specially indicated drivers, by events in particular locations, on particular vehicles, etc. to the fleet user. If the user desires to understand why an event is declared of low interest, an optional network may produce an explanation. The training of this network is nearly analogous to the training of the single output network above, with the key difference being that the error for each event is now the magnitude of the difference between the video raters' reasons [a b c . . . n] and those produced by the multiple network outputs [p q r . . . z].

In one embodiment, the normalized PPE data is mathematically transformed by a multi-layer neural network into a value close to the (human's) rating that has been assigned to the respective video.

With continued reference to FIG. 6, the output at the neural network output produced at 1150 represents an association/transformation from/of the PPE data to the human reviewer video rating. This transformation is a multi-input, single output, mathematical function whose internal transformation parameters and structure are adjusted to produce the best association. The adjustment is done via the back-propagation algorithm. Because there are 60 inputs, and these may represent many possible real-world scenarios, a sufficiently large number of transformation parameters will be needed and a sufficiently complicated structure able to accommodate all these parameters is also required. The simple speed normalization transformation discussed above allowed for an increased original speed producing an increased normalized speed relationship, a simple case (input goes up always means output goes up). A more complicated relationship needs to accommodate and account for the many possible orderings and time relationships between the 60 input variables. In addition, some of the input PPE data will be the result of false detections (e.g., a transient small radar distance to the 'vehicle' ahead, this produced by, for example, a raised manhole cover, or by a transient vertical acceleration created from a pothole) so must account for more than just 'clean' traffic participant behaviors and so also be able to remove noise. Thus, with the many scenarios requiring false positive rejection, the many scenarios created by multiple interacting traffic actors, and the multiplicity of interacting time sequences, over 155,000 transformation parameters are used in the network.

Figure 7:
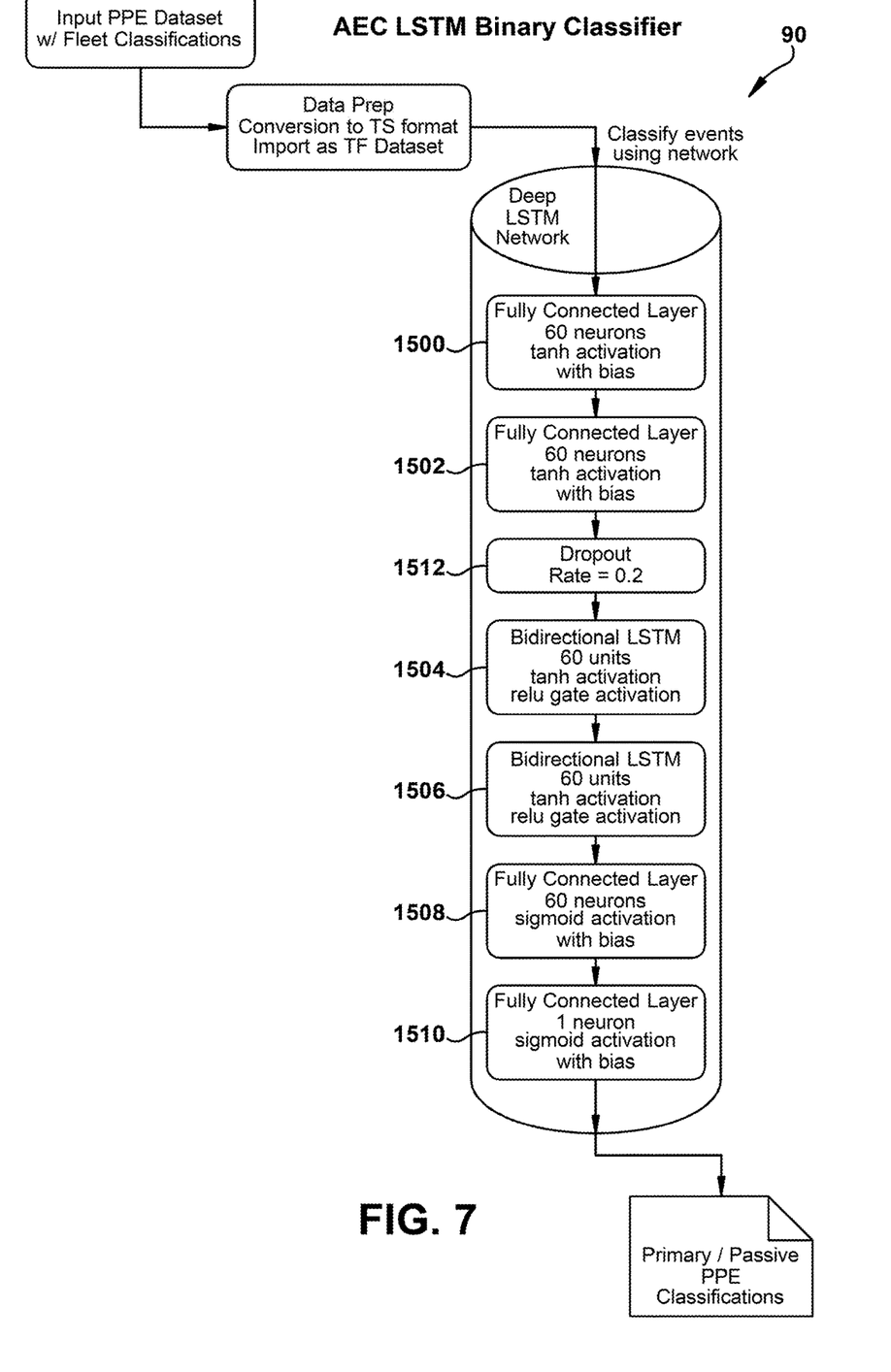
FIG. 7 illustrates a block diagram of a neural network configured to implement one or more aspects of an embodiment illustrating principles of the present invention.

With reference to FIG. 7, multiple machine learning methods may be used to relate sets of input variables to an output. Support vector machines, multi-layer perceptrons, and deep neural networks are examples of these methods. As illustrated in FIG. 7, a deep neural network 90 includes different types of layers, with two of these layers chosen for their utility in time-series analysis (e.g. speech recognition).

The (normalized) PPE data is fed to a first, fully-connected layer of neurons with hyperbolic tangent (tanh) activation functions. Each neuron has one or more inputs, a weight value associated with each of its inputs, and a bias. The hyperbolic tangent converts the input value—on the horizontal axis below—into a value between −1 and +1, on a vertical axis, following an S-shape. Each PPE vector element is multiplied by its weight, a 'bias' is added to this product, and the result given to a tanh function. The output of each tanh function (=tanh(factors*inputs+bias)) in the first layer is sent to each tanh function in a second, fully-connected layer, which now receives individually weighted inputs from each neuron in the first layer, and to which a bias is also added. For 60 neurons in the first layer feeding 60 neurons in the second layer, this means that such full connectivity has 60*60=3600 connections. The S-shape of a tanh function is important, as it allows for non-linear relationships between input and output. Following this first tanh layer with a second tanh layer allows for further complexity in the input to output relation. As every neuron in one layer is connected to every neuron in an adjacent layer, the large number of connection weights allows for a high system complexity and performance.

With the five layers 1500, 1502, 1504, 1506, 1508 of the network used here, which finishes with a (sixth layer 1510) single output neuron, complicated PPE to rating relationships may be learned. To reduce the chances that the network learns overly specific details of the data with which it is trained, dropout (see 1512) is used. A 20% dropout rate means that a random 20% of the neurons in the second layer 1502 are temporarily ignored—not used—at different time steps during training (which is iterative) and their outputs are not used in further processing. This random disuse of second layer 1502 neurons produces improved overall network behavior, as the network is forced to spread knowledge of the input-output relationship over all neurons, whereby individual neurons become less important, and the network performs better when given PPE data that has not evaluated before. It is sensible to apply dropout after an initial layer or two of neurons, and not at the input layer, as doing so there would mean that some PPE inputs are randomly ignored and data would be not be used.

The next layers 1504, 1506 are the core of the machine learning here, as these are specific to learning time-series behaviors. These two layers are the most complicated part of the network and contain a total of 144,000 adjustable parameters. The 'memory' component of these Long Short-Term Memory (LSTM) units is able to retain past values. Layer 1504 is a forward LSTM layer while layer 1506 is a backward LSTM layer. In conjunction, these two layers construct a bidirectional LSTM that is designed (e.g., particularly suitable) for time-series machine learning. The outputs of the forward LSTM layer are different than typical fully-connected layers. The forward layer uses an option to return sequences, meaning that the forward layer provides to the backward layer all of its hidden state outputs for each input time step. The backward layer does not use the return sequence option and thus provides its outputs as usual to the next fully-connected layer. The bidirectional LSTM architecture means that layer 1504 analyzes the PPE in the forward direction while the following LSTM layer 1506 analyzes the PPE in the backward direction (in time). Thus, these layers retain a memory of the future and past values, and the overall effect is improved learning of spatial and time-series data. This may be understood as the future arising plausibly from the observed past, and the past being plausibly able to create the observed future. This improved behavior exceeds that of systems that only use the current, or current and past values for their modeling, or systems that infer in one direction only. The simultaneous presentation of the entire event history, with measurements coming from before and after the event, aligns with this bidirectional architecture.

The final layers use sigmoid functions to relate their weighted inputs (+bias) to their outputs. Sigmoid functions are similar in behavior to hyperbolic tangents, and also have an S-shaped input to output behavior. The output of a sigmoid is a value between 0 and 1. When used in the output layer with a single neuron, the sigmoid function outputs can be binarized using a rounding function to convert the floating-point value to a binary 0 or 1 rating for comparison with the targets during the network training process. However, in the inference phase these outputs are not rounded but kept as the floating-point value generated by the network. This value serves as an importance score of the input event for end-user consumption.

Every layer here except for the final one contains 60 neurons. The output of every neuron in a previous layer goes to every neuron in the next one (i.e. the network is fully-connected). In the final layer (just a single neuron, as mentioned), the outputs of each of the 60 sigmoid neurons in the previous layer are (individually) weighted, a bias is added, and this passes through a single sigmoid to produce the network's output value or rating.

A comparison is then made with the human rating: Difference=absolute value of (human rating−machine rating) and the differences for many paired human video ratings/machine PPE ratings are summed. A small summed value, that is a small output error, reflects close ratings agreement between the human and the machine. This summed difference is the quantity that the machine learning learns to optimize via the back-propagation mentioned earlier. Alternative metrics for network performance are available. These include e.g. binary cross-entropy loss (for a single output network) and categorical cross-entropy (for multiple output, multi-class networks).

The many parameter values in the neural network are adjusted by ADAM back propagation or similar methods. Back propagation is a mathematical method of adjusting parameters in a network, where the adjustment is driven by the summed output error above. The basic idea is to alter the weights and bias on the inputs for a neuron proportional to the effect that they have on the output and to the summed difference. The ADAM method deals well with the noisy nature of the measurements here, where false events may occur as described above. The result is a proxy-based rating, created from processing of the PPE data alone, for the videos. This rating ranges in continuous fashion between 0 and 1. The non-binarity means that the videos associated with the PPE data can be continuously ordered and that information is not lost. Systems that round such continuous values to the nearest integer would produce a rating of either 0 or 1, so losing information in the process. Furthermore, such integer rounded values cannot be finely sorted beyond belonging into either one of two bins, and so the human user is not as effectively guided to the most or more interesting material.

Another embodiment may indicate when no known event type has been classified from the data, marking e.g., that further manual review is needed.

Another embodiment may use multiple output neurons, with each corresponding to an event of interest, optionally with another output neuron for 'undecided/needs review'. The softmax normalization described above, together with the 'one hot' or 'top-N values' may be used to recognize what sort of (single—'one hot') event has occurred, or what event(s) are most likely ('top-N') to have taken place. That is, just as networks can determine whether an event has actually occurred, they can also determine what sort of event it was.

Another embodiment considers that there are multiple portions of the event classification chain where errors may be made. These are in the sensor(s) (e.g., the forward distance sensor 260) declaring (e.g., triggering) an event, in the (first, training) human raters classifying an event, in the machine learning to associate the event PPE (e.g., recorded vehicle sensor event data) with the human ratings, in the machine inferring whether an event actually occurred, and then also in a second, possible, after the machine flagged it, human rating step. The idea of a majority vote and multiple, different, independent, instances of judgement being passed may be used to identify those classification chain portions where errors originate. Because the machine produces continuous ratings, and indicates uncertainty thereby, difficult, someone must be wrong situations, where e.g., two humans disagree, may be avoided, and 'everyone/no one is right' may be declared, or alternatively, the machine may side with one human rater over the other.

An example of sources of classification errors: the sensor, e.g. an accelerometer, a yaw rate sensor, a GPS, a brake pressure measurement, along with its associated signal processing (e.g. noise removal, interpolation, trigger conditions, etc.) may incorrectly declare an event. For instance, an accelerometer may detect a momentarily large value arising from a pothole or traversing train tracks and incorrectly declare a strong braking event. If the (first) human reviewer seeing, say, the nighttime video of this is not attentive, she may declare that this strong braking actually did occur, this because it was not possible to see well exactly what transpired in the dark video. The associative machine that is trained with instances of this faulty data may then need to compromise between real strong braking events and such false positives, and so (incorrectly) allow for some misclassification. A (second) human cursorily reviewing video of this event after the associative machine has declared it of interest may make the same mistake as the first and let the false positive persist, whereas a proper full viewing and perhaps even manual PPE data review would have shown it to be false. Because the two humans viewing the same event are likely different people, however, the chances of making such similar, biased, faulty, judgement are lowered, a sort of trial by jury.

There are thus multiple (e.g., between 2 and 4) locations where judgement is rendered re vehicle events, in the sensor(s) itself (along with their processing), in an initial human video rating, and the associative machine coupling together sensor time histories (PPE) to human ratings, and in a possible second human rating. One usage scenario is where the sensor(s) detect an event, the associative machine analyzes the PPE data, declaring it of low interest, and an after the machine human reviewer then checks the associated video, verifying that the sensor(s) and its associated signal processing were indeed wrong. Another usage scenario is where events are examined by two human reviewers, and these reviewers disagree. The machine functions as an impasse-breaker when it is certain enough. The machine acts as a decider, choosing either one side or neither if it is sufficiently uncertain.

Statistics may be collected for how often each rater is declared wrong. Should the frequency of one rater being declared wrong be significantly higher than for another rater, we may prefer to use one rater rather than another, or perhaps use raters that perform well on specific event types.

In one embodiment, a sensor that is presumed to produce correct event detections, e.g. a radar system indicating an imminent need to brake triggers recording of event PPE (e.g., recorded novel vehicle sensor event data 'recorded PPE') and videos. The behavior of the sensor is verified for correctness. The trained associative machine (e.g., a neural network) examines the recorded PPE and classifies the detections into the predetermined classifications of proper, less proper, and not proper, as before. In one experiment, this produced a 31% rate of not proper radar detections, that is, there was no need to brake, because, e.g. there was no target present, or, only a momentarily present spurious detection (e.g. from a manhole cover) had occurred. An independent (human) review of the associated video found that 34% of the recorded events, encompassing the associative machine's classifications, were not proper. Thus, the associative machine is able to judge the quality of a sensor and function as an expert reference for further improvements in that sensor and its signal processing.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A fleet management server comprising:
a memory;
a processor, coupled to the memory, wherein the processor includes a program stored on computer readable medium configured to:
receive new vehicle event data, including new pre-post event (PPE) data, representing a new vehicle event that occurred when a vehicle condition threshold was exceeded while a driver was driving a vehicle;
automatically assign a predicted importance, using a floating point value, to the new vehicle event based on a previous manually assigned classification, based on both past image data and past PPE data, and the new PPE data, the floating point value varying from a first binary classification to a second binary classification; and
output, to a user display, a representation of the new event data based on the automatically assigned predicted importance for the new vehicle event to reduce the user's time spent reviewing the new event data.

2. The fleet management server as set forth in claim 1, wherein the processor is further configured to:
receive past vehicle event data, including both the past image data and the past PPE data, associated with at least one vehicle and at least one driver, the past event data representing at least one respective past vehicle event that occurred when the vehicle condition threshold was previously exceeded while one of the drivers was driving one of the vehicles.

3. The fleet management server as set forth in claim 2, wherein the processor is further configured to:
receive respective predetermined at least binary classifications of the at least one past vehicle events that were previously manually assigned based on the respective past vehicle event data of the past vehicle events.

4. The fleet management server as set forth in claim 3, wherein the processor is further configured to:
automatically assign the predicted importance to the new vehicle event using the new PPE data as a proxy for new image data of the new vehicle event data and without using the actual new image data of the new vehicle event.

5. The fleet management server as set forth in claim 4, wherein the processor is further configured to:
output, to the user, a ranking for the new vehicle event based on the automatically assigned predicted importance.

6. The fleet management server as set forth in claim 5, wherein the processor is further configured to:
output the representation, to the user, in an order based on the ranking of the automatically assigned predicted importance.

7. The fleet management server as set forth in claim 1, wherein the processor is further configured to:
automatically assign the predicted importance to the new vehicle event using the new PPE data as a proxy for new image data of the new vehicle event data and without using the actual new image data of the new vehicle event.

8. The fleet management server as set forth in claim 1, further including a neural network, wherein:
the processor is configured to communicate the new PPE data to the neural network and receive the automatically assigned predicted importance from the neural network.

9. The fleet management server as set forth in claim 1, wherein the processor is further configured to:
output, to the user, a ranking for the new vehicle event based on the automatically assigned predicted importance.

10. The fleet management server as set forth in claim 1, wherein the processor is further configured to:
output the representation, to the user, in an order based on the ranking of the automatically assigned predicted importance.

11. The fleet management server as set forth in claim 1, wherein:
the memory and the processor are located remote from the fleet management server.

12. The fleet management server as set forth in claim 11, wherein:
the memory and the processor are located on the vehicle from which the new vehicle event data was received.

13. The fleet management server as set forth in claim 1, wherein the new PPE data includes:
at least one of a speed of the vehicle, a steering angle of the vehicle, a braking force the vehicle and a distance to a forward vehicle.

14. The fleet management server as set forth in claim 1, wherein:
the PPE data extends from 5 seconds before the new vehicle event to 5 seconds after the new vehicle event.

15. The fleet management server as set forth in claim 1, wherein:
the representation of the new event data is color-coded based on a severity of the new event.

16. A method of automatically assigning a predicted importance to a new vehicle event, the method comprising:
receiving new event data, including new pre-post event (PPE) data, representing a new vehicle event that occurred when a vehicle condition threshold was exceeded while a driver was driving a vehicle;
automatically assigning a predicted importance, using a floating point value, to the new vehicle event based on a previous manually assigned classification, based on both past image data and past PPE data, and the new PPE data, the floating point value varying from a first binary classification to a second binary classification; and
outputting, to a user display, a representation of the new event data based on the automatically assigned predicted importance for the new vehicle event to reduce a user's time spent reviewing the new event data.

17. The method of automatically assigning a predicted importance to a new vehicle event as set forth in claim 16, further including:
receiving past vehicle event data, including both the past image data and the past PPE data, associated with at least one vehicle and at least one driver, the past event data representing at least one respective past vehicle event that occurred when the vehicle condition threshold was previously exceeded while one of the drivers was driving one of the vehicles.

18. The method of automatically assigning a predicted importance to a new vehicle event as set forth in claim 17, further including:
receiving respective predetermined at least binary classifications of the at least one past vehicle events that were previously manually assigned based on the respective past vehicle event data of the past vehicle events.

19. The method of automatically assigning a predicted importance to a new vehicle event as set forth in claim 18, further including:
automatically assigning the predicted importance to the new vehicle event using the new PPE data as a proxy for new image data of the new vehicle event data and without using the actual new image data of the new vehicle event.

20. The method of automatically assigning a predicted importance to a new vehicle event as set forth in claim 19, further including:
ranking the new vehicle event based on the automatically assigned predicted importance; and
outputting, to the user, the ranking of the new vehicle event.

21. The method of automatically assigning a predicted importance to a new vehicle event as set forth in claim 20, further including:
outputting the representation, to the user, in an order based on the ranking of the automatically assigned predicted importance.

22. The method of automatically assigning a predicted importance to a new vehicle event as set forth in claim 16, further including:

automatically assigning the predicted importance to the new vehicle event using the new PPE data as a proxy for new image data of the new vehicle event data and without using the actual new image data of the new vehicle event.

23. The method of automatically assigning a predicted importance to a new vehicle event as set forth in claim 16, further including:

transmitting the new PPE data to a neural network; and
    receiving the automatically assigned predicted importance from the neural network.

24. The method of automatically assigning a predicted importance to a new vehicle event as set forth in claim 16, further including:

outputting, to the user, a ranking for the new vehicle event based on the automatically assigned predicted importance; and outputting the representation, to the user, in an order based on the ranking.

25. The method of automatically assigning a predicted importance to a new vehicle event as set forth in claim 16, further including:

identifying in the PPE data at least one of a speed of the vehicle, a steering angle of the vehicle, a braking force the vehicle and a distance to a forward vehicle.

26. The method of automatically assigning a predicted importance to a new vehicle event as set forth in claim 16, further including:

obtaining the PPE data from 5 seconds before the new vehicle event to 5 seconds after the new vehicle event.

27. The method of automatically assigning a predicted importance to a new vehicle event as set forth in claim 16, further including:

representing the new event data as color-coded based on a severity of the new event.

28. A system of automatically assigning a predicted importance to a new vehicle event, the system comprising:

a memory on a vehicle;
    a processor, on the vehicle, coupled to the memory, wherein the processor is configured to:
        receive new vehicle event data, including new pre-post event (PPE) data, representing a new vehicle event that occurred when a vehicle condition threshold was exceeded while a driver was driving a vehicle; and
    a server receiving the PPE data from the processor, wherein the server is configured to:
        automatically assign a predicted importance, using a floating point value, to the new vehicle event based on a previous manually assigned classification, based on both past image data and past PPE data, and the new PPE data, the floating point value varying from a first binary classification to a second binary classification; and
    an output display that outputs a representation of the new event data, to a user, based on the automatically assigned predicted importance for the new vehicle event to reduce a user's time spent reviewing the new event data.

29. The system as set forth in claim 28, wherein the server is remote from the vehicle.

30. The system as set forth in claim 29, further including:

a transmitter, on the vehicle, that communicates with the processor and transmits the new PPE data; and
    a receiver, on the server, that receives the new PPE data from the transmitter.

31. A system of automatically assigning a predicted importance to a new vehicle event, the system comprising:

a memory on a vehicle;
    a processor, on the vehicle, coupled to the memory, wherein the processor is configured to:
        receive new vehicle event data, including new pre-post event (PPE) data, representing a new vehicle event that occurred when a vehicle condition threshold was exceeded while a driver was driving a vehicle;
    means for automatically assigning a predicted importance, using a floating point value, to the new vehicle event based on a previous manually assigned classification, based on both past image data and past PPE data, and the new PPE data, the floating point value varying from a first binary classification to a second binary classification; and
    an output display that outputs a representation of the new event data, to a user, based on the automatically assigned predicted importance for the new vehicle event to reduce a user's time spent reviewing the new event data.

\* \* \* \* \*